United States Patent
Oleson et al.

(10) Patent No.: US 11,464,101 B1
(45) Date of Patent: Oct. 4, 2022

(54) CONDUCTIVE BRUSH FOR PROTECTING A MOTOR SHAFT BEARING

(71) Applicant: DELTA T, LLC, Lexington, KY (US)

(72) Inventors: Richard A. Oleson, Lexington, KY (US); Ivica Luka Simic, Lexington, KY (US)

(73) Assignee: DELTA T, LLC, Lexington, KY (US)

( * ) Notice: Subject to any disclaimer, the term of this patent is extended or adjusted under 35 U.S.C. 154(b) by 415 days.

(21) Appl. No.: 16/658,776

(22) Filed: Oct. 21, 2019

Related U.S. Application Data

(60) Provisional application No. 62/748,799, filed on Oct. 22, 2018.

(51) Int. Cl.
*H05F 3/04* (2006.01)
*F16C 33/12* (2006.01)
*D02G 3/12* (2006.01)
*D02G 3/44* (2006.01)

(52) U.S. Cl.
CPC ............ *H05F 3/04* (2013.01); *F16C 33/121* (2013.01); *D02G 3/12* (2013.01); *D02G 3/441* (2013.01); *D10B 2101/20* (2013.01); *D10B 2401/16* (2013.01)

(58) Field of Classification Search
CPC ......... H05F 3/04; F16C 33/121; D02G 3/12; D02G 3/441; D10B 2101/20; D10B 2401/16
USPC ................................................. 361/231, 221
See application file for complete search history.

(56) References Cited

U.S. PATENT DOCUMENTS

| | | | | |
|---|---|---|---|---|
| 5,508,879 A * | 4/1996 | Kitamura | ........... | G03G 15/0131 399/175 |
| 7,528,513 B2 * | 5/2009 | Oh | ......... | H02K 11/40 310/88 |
| 8,189,317 B2 * | 5/2012 | Oh | ......... | H02K 11/40 310/309 |
| 8,963,398 B2 * | 2/2015 | Roman | ................. | H02K 11/40 310/239 |
| 11,070,114 B2 * | 7/2021 | Lenz | ...................... | H01R 39/12 |
| 2004/0184215 A1 * | 9/2004 | Oh | ........... | H05F 3/02 361/220 |
| 2005/0052088 A1 * | 3/2005 | Kakegawa | ............ | F16C 33/121 310/90 |
| 2006/0007609 A1 * | 1/2006 | Oh | ......... | H02K 11/40 361/23 |
| 2008/0258576 A1 * | 10/2008 | Oh | ......... | H02K 11/40 310/249 |
| 2011/0216466 A1 * | 9/2011 | Oh | ......... | H02K 11/40 361/221 |
| 2015/0306382 A1 * | 10/2015 | Purushothaman | ....... | A61N 1/05 607/116 |
| 2019/0081538 A1 * | 3/2019 | Nye | ....................... | H01R 39/12 |

(Continued)

*Primary Examiner* — Dharti H Patel
(74) *Attorney, Agent, or Firm* — Dickinson Wright PLLC; Andrew D. Dorisio

(57) ABSTRACT

An apparatus prevents electrical arcing between a motor including a rotating shaft and an associated bearing within a motor housing. A brush is formed of a conductive fabric for electrically connecting the rotating shaft to the motor housing. The conductive fabric may comprise randomly arranged or non-woven conductive fibers in contact or woven conductive fibers. The fabric may comprise a wool or felt. The apparatus may be applied to a fan. A related method is also disclosed.

20 Claims, 3 Drawing Sheets

(56) References Cited

U.S. PATENT DOCUMENTS

2019/0181729 A1* 6/2019 Kim .................. H02K 11/40
2019/0296617 A1* 9/2019 Hubert ................ H01R 39/64

* cited by examiner

CONDUCTIVE BRUSH FOR PROTECTING A MOTOR SHAFT BEARING

This application claims the benefit of U.S. Provisional Patent Application Ser. No. 62/748,799, the disclosure of which is incorporated herein by reference.

TECHNICAL FIELD

This disclosure relates generally to electrical protection and, more particularly, to a conductive brush for protecting a motor shaft bearing.

BACKGROUND

In the construction of electric motors, it is common to use ball bearings at the motor shaft due to their long life and low friction. However, a concern associated with ball bearings in this application is that the ground connection between the motor housing and the shaft passes through the individual balls in the bearing. As the shaft rotates and the balls move, this electrical connection may pass through phases of greater or less resistance. As a result, electrical arcing can occur inside the bearing during operation. This causes electromagnetic emissions which may interfere with electronic devices in the area, and can also physically damage the bearing races and balls.

A variety of methods have been used in an attempt to alleviate this condition, but each has significant shortcomings. For example, ball bearings are available with non-conductive ceramic balls; however, these are costly, and they leave the motor with no ground connection between the shaft and the housing. Another solution involves attaching a wiper contact of conductive sheet metal to the housing so that the wiper rubs on the shaft; these, however, tend to be noisy and subject to wear in service. Brushes of conductive carbon fibers are also used in a similar manner, and these do not make audible noise or rapidly wear out; however, it is possible for the individual fiber tips to arc to the shaft, avoiding damage to the bearing but still generating objectionable electromagnetic emissions.

SUMMARY

According to one aspect of the disclosure, an apparatus for preventing electrical arcing is provided. The apparatus comprises a motor including a rotating shaft and an associated bearing within a motor housing. The apparatus further comprises a brush including a conductive fabric for electrically connecting the rotating shaft to the motor housing.

In some embodiments, the brush comprises a conductive base connected to the conductive fabric. A conductive fastener may also be provided for connecting the brush to the motor housing. The conductive fabric may non-woven or randomly arranged conductive fibers in contact with each other or non-woven conductive fibers. The conductive fabric may comprise wool, such as copper wool, or a conductive felt.

In some embodiments, the apparatus may be applied to a fan, such as a ceiling fan. The fan may comprise the motor and rotating shaft, as well as a hub supporting a plurality of blades.

According to a further aspect of the disclosure, an apparatus is disclosed comprising a stationary part, a rotating part, and a brush including conductive fabric for electrically connecting the stationary part to the rotating part.

The stationary part may comprise a housing and the rotating part may comprise a motor shaft. The conductive fabric may comprise woven conductive fibers or non-woven conductive fibers (including in the form of felt or wool).

This disclosure also pertains to a method of preventing electrical arcing in a motor. The method comprises electrically connecting a rotating shaft with a stationary part of the motor using a brush comprising a conductive fabric. The method further includes the step of connecting the rotating shaft to a plurality of fan blades.

DETAILED DESCRIPTION

The following description of certain examples of the invention should not be used to limit the scope of the disclosure. Other examples, features, aspects, embodiments, and advantages of the invention will become apparent to those skilled in the art from the following description, which includes by way of illustration, one or more of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Fan Overview

Figure 1:
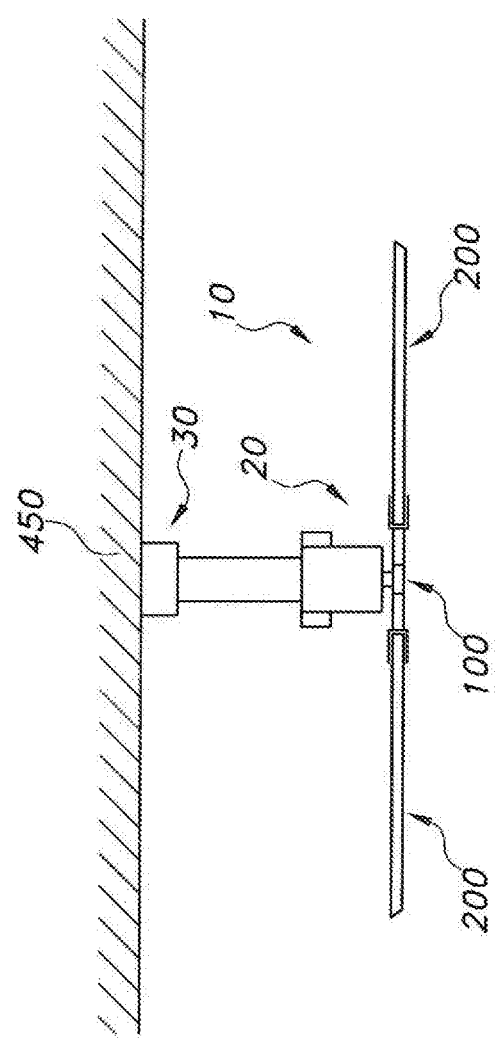
FIG. 1 depicts an exemplary machine, such as a fan having a motor assembly, a hub assembly, a support, a plurality of fan blades, and a mounting system coupled with joists.

Referring to FIG. 1, a fan (10) of the present example comprises a motor assembly (20), a support (30), a hub assembly (100), and a plurality of fan blades (200). In the present example, fan (10) (including hub assembly (100) and fan blades (200)) has a diameter of approximately 8 feet. In other variations, fan (10) has a diameter between approximately 6 feet, inclusive, and approximately 24 feet, inclusive. Alternatively, fan (10) may have any other suitable dimensions.

Support (30) is configured to be coupled to a surface or other structure at a first end such that fan (10) is substantially attached to the surface or other structure. As shown in FIG. 1, one such example of a structure may be a ceiling joist (450). Support (30) of the present example comprises an elongate metal tube-like structure that couples fan (10) to a ceiling, though it should be understood that support (30) may be constructed and/or configured in a variety of other suitable ways as will be apparent to one of ordinary skill in the art in view of the teachings herein. By way of example only, support (30) need not be coupled to a ceiling or other overhead structure, and instead may be coupled to a wall or to the ground. For instance, support (30) may be positioned on the top of a post that extends upwardly from the ground. Alternatively, support (30) may be mounted in any other suitable fashion at any other suitable location. This includes, but is not limited to, the teachings of the patents, patent publications, or patent applications cited herein. By way of example only, support (30) may be configured in accordance with the teachings of U.S. Pat. Pub. No. 2009/0072108, entitled "Ceiling Fan with Angled Mounting," published Mar. 19, 2009, the disclosure of which is incorporated by reference herein. As yet another alternative, support (30) may have any other suitable configuration. Furthermore, support (30) may be supplemented in numerous ways. One merely illustrative example is described in detail below, while other examples and variations will be apparent to those of ordinary skill in the art in view of the teachings herein.

Motor assembly (20) of the present example comprises an inside-out, permanent magnet brushless DC motor having a drive shaft, though it should be understood that motor assembly (20) may alternatively comprise any other suitable type of motor (e.g., an AC induction motor, a brushed motor, etc.). In the present example, motor assembly (20) is fixedly coupled to support (30) and rotatably coupled to hub assembly (100). Furthermore, motor assembly (20) is operable to rotate hub assembly (100) and the plurality of fan blades (200). By way of example only, motor assembly (20) may be constructed in accordance with at least some of the teachings of U.S. Pat. Pub. No. 2009/0208333, entitled "Ceiling Fan System with Brushless Motor," published Aug. 20, 2009, the disclosure of which is incorporated by reference herein. Furthermore, fan (10) may include control electronics that are configured in accordance with at least some of the teachings of U.S. Pat. Pub. No. 2010/0278637, entitled "Ceiling Fan with Variable Blade Pitch and Variable Speed Control," published Nov. 4, 2010, the disclosure of which is incorporated by reference herein. Alternatively, motor assembly (20) may have any other suitable components, configurations, functionalities, and operability, as will be apparent to those of ordinary skill in the art in view of the teachings herein.

Hub assembly (100) may be constructed in accordance with at least some of the teachings of United States Patent Application Publication No. 2010/0278637, entitled "Ceiling Fan with Variable Blade Pitch and Variable Speed Control," published Nov. 4, 2010, the disclosure of which is incorporated by reference herein. Alternatively, hub assembly (100) may be constructed in accordance with any of the teachings or other patent references cited herein. Still other suitable ways in which hub assembly (100) may be constructed will be apparent to those of ordinary skill in the art in view of the teachings herein. It should also be understood that an interface component (not shown) may be provided at the interface of each fan blade (200) and hub assembly (100). By way of example only, such an interface component may be configured in accordance with the teachings of U.S. Pat. Pub. No. 2009/0081045, entitled "Aerodynamic Interface Component for Fan Blade," published Mar. 26, 2009, the disclosure of which is incorporated by reference herein. Of course, such an interface component may be omitted if desired.

Fan blades (200) may further be constructed in accordance with some or all of the teachings of any of the patents, patent publications, or patent applications cited herein. For example, fan blades (200) may be configured in accordance with the teachings of U.S. Pat. No. 7,284,960, entitled "Fan Blades," issued Oct. 23, 2007; U.S. Pat. No. 6,244,821, entitled "Low Speed Cooling Fan," issued Jun. 12, 2001; and/or U.S. Pat. No. 6,939,108, entitled "Cooling Fan with Reinforced Blade," issued Sep. 6, 2005. The disclosures of each of those U.S. patents are incorporated by reference herein. As another merely illustrative example, fan blades (200) may be configured in accordance with the teachings of U.S. Pat. Pub. No. 2008/0008596, entitled "Fan Blades," published Jan. 10, 2008, the disclosure of which is also incorporated by reference herein. As yet another merely illustrative example fan blades (200) may be configured in accordance with the teachings of U.S. Pat. Pub. No. 2010/0104461, entitled "Multi Part Modular Airfoil Section and Method of Attachment Between Parts," published Apr. 29, 2010, the disclosure of which is incorporated by reference herein. Alternatively, any other suitable configurations for fan blades (200) may be used in conjunction with the examples described herein. In the present example, fan blades (200) are formed of aluminum through an extrusion process such that each fan blade has a substantially uniform cross section along its length. It should be understood that fan blades (200) may alternatively be formed using any suitable material, or combination of materials, by using any suitable technique, or combination of techniques, and may have any suitable cross-sectional properties or other properties as will be apparent to one of ordinary skill in the art in view of the teachings herein.

Fan blades (200) of the present example may further include a variety of modifications. By way of example only, fan blade (200) of the present example further comprises a winglet (220) coupled to the second end (204) of fan blade (200). Winglets (220) may be constructed in accordance with some or all of the teachings of any of the patents, patent publications, or patent applications cited herein. For instance, winglets (220) may be configured in accordance with at least some of the teachings of U.S. Pat. No. 7,252,478, entitled "Fan Blade Modifications," issued Aug. 7, 2007, the disclosure of which is incorporated by reference herein. As another merely illustrative example, winglets (220) may be configured in accordance with the teachings of U.S. Pat. Pub. No. 2008/0014090, entitled "Cuffed Fan Blade Modifications," published Jan. 17, 2008, the disclosure of which is incorporated by reference herein. As yet another merely illustrative example, winglets (220) may be configured in accordance with the teachings of U.S. Pat. No. D587,799, entitled "Winglet for a Fan Blade," issued Mar. 3, 2009, the disclosure of which is incorporated by reference herein. Of course, any other suitable configuration for winglets (220) may be used as will be apparent to those of ordinary skill in the art in light of the teachings herein.

It should also be understood that winglet (220) is merely optional. For instance, other alternative modifications for fan blades (200) may include end caps, angled airfoil extensions, integrally formed closed ends, or substantially open ends. By way of example only, an angled extension may be added to the free end of each fan blade (200) in accordance with the teachings of U.S. Pat. Pub. No. 2008/0213097, entitled "Angled Airfoil Extension for Fan Blade," published Sep. 4, 2008, the disclosure of which is incorporated by reference herein. Other suitable structures that may be associated with second end (204) of each fan blade (200) will be apparent to those of ordinary skill in the art in view of the teachings herein.

II. Conductive Brush Overview

Figure 2:
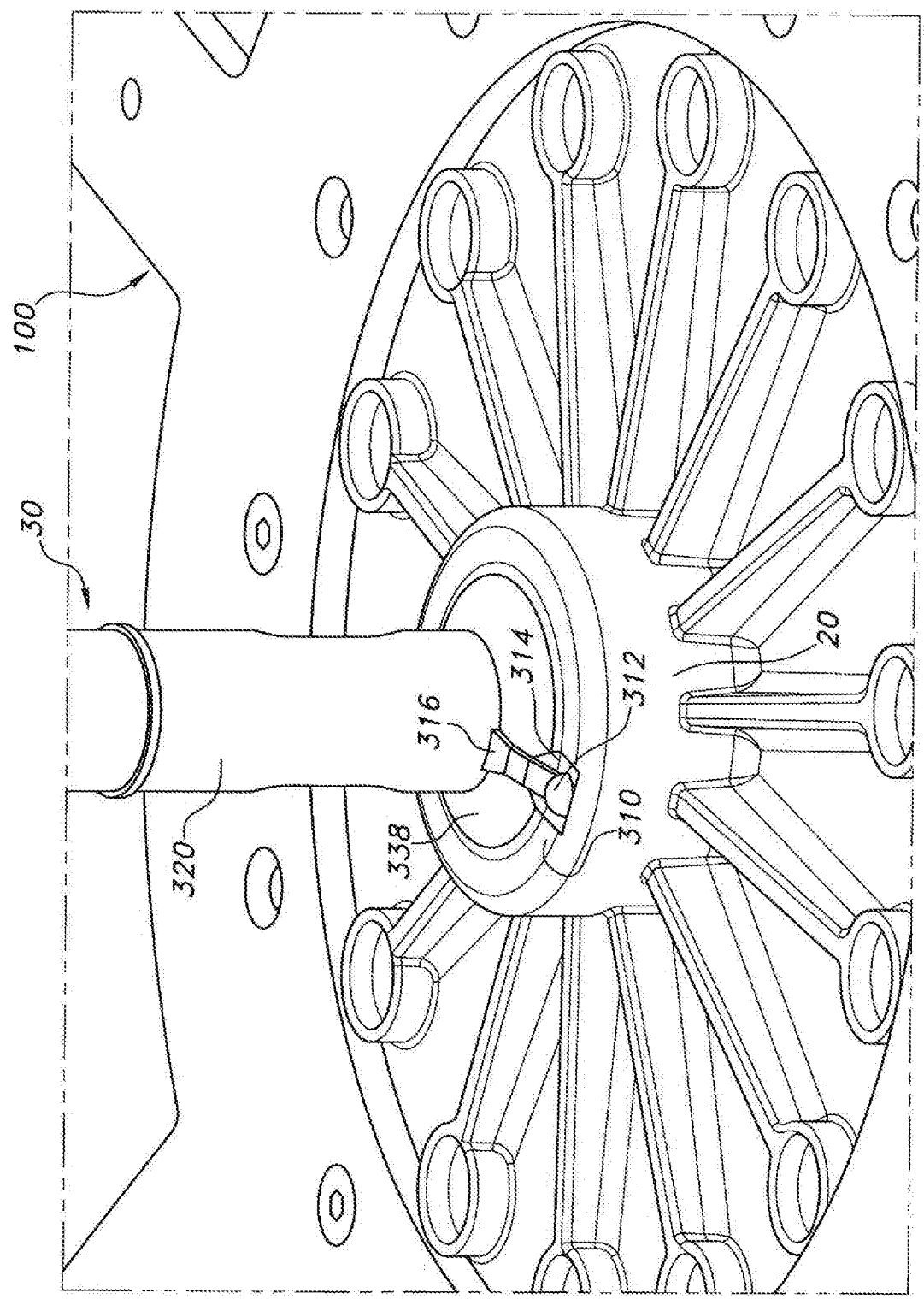
FIG. 2 illustrates one embodiment of a conductive brush installed on an electric motor.

As shown in FIG. 2, an anti-arcing device in the form of an electrical conductor (310) including a brush is provided to make a continuous electrical connection between a non-rotating part, such as housing (330) and a rotating part, such as shaft (320) of motor assembly (20), such as for the purpose of preventing electrical arcing in the shaft bearings for rotatably supporting the shaft within the housing. One end of the conductor (310) is affixed to the housing (330) by an electrically conductive connector (312), such as a rivet or a screw embedded into the housing (330), which may be fabricated of metal. The opposite end of the conductor (310) is configured to contact the outer surface of the shaft (320), making an electrically conductive connection between the stationary housing (330) and the rotating shaft (320).

Figure 3:
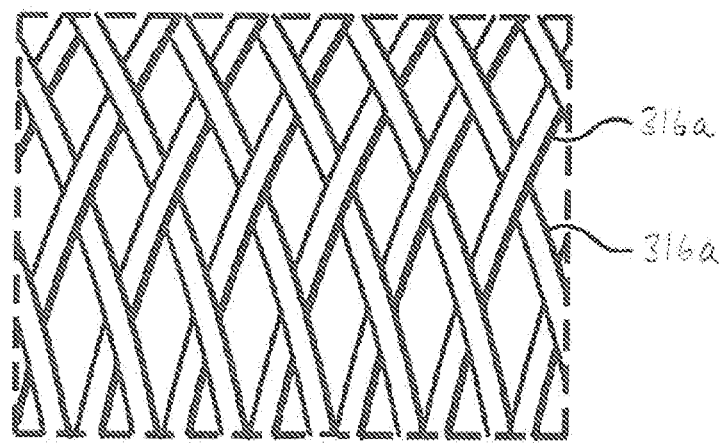
FIG. 3 illustrates one embodiment of a conductive fabric.
Figure 4:
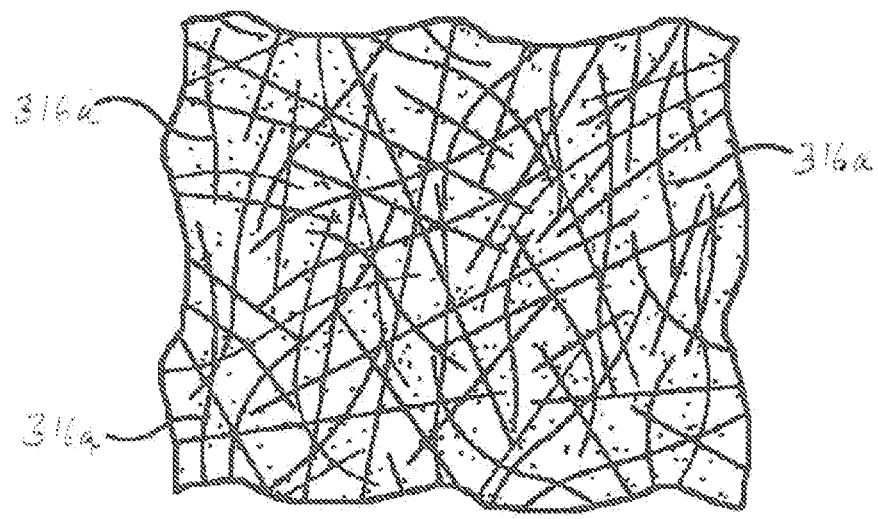
FIG. 4 illustrates another embodiment of a conductive fabric.

In one embodiment, the portion of the conductor (310) attached to the housing (330) comprises a conductive base (314), such as a tab of sheet metal. The portion of the conductor (310) for contacting the motor shaft (320) comprises a brush formed of a conductive fabric (316) The fabric (316) may comprise a woven arrangement of conductive fibers (316a), as shown in FIG. 3, or nonwoven mass of conductive fibers (316a), as shown in FIG. 4, which may be randomly arranged and provided in a matted configuration as a felt. The conductive base (314) and the fabric (316) may be joined together by crimping, soldering, or an appropriate electrical connector (312). The fibers (316a) may comprise a conductive metal, such as for example copper.

The interconnected arrangement of the fibers in the fabric (316) creates multiple electrically conductive paths through the material, such that there are always multiple fibers in contact with the shaft (320), substantially all of which carry an approximately equal electrical potential. In this condition, if one fiber should lose contact with the shaft (320) momentarily, other fibers will carry the electrical current to or from the shaft (320) without allowing a charge to build up at the point of lost connection which might result in an arc between the disconnected fiber and the shaft (320). This constant condition of multiple conductive paths prevents the generation of objectionable electromagnetic emissions due to arcing either through the bearings or between the conductor (310) itself and the shaft (320).

In addition, the intermeshing nature of the fibers within the mass of fabric (316) makes the fibers mutually damping so that there is no audible frequency at which the device (310) can resonate to create an audible noise. This characteristic ensures silence in operation, another advantage over other existing approaches.

An example of a suitable conductive fabric material for use as the brush (316) is distributed by Rogue River Tools (fine grade copper wool).

Each of the following terms written in singular grammatical form: "a", "an", and the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component," "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase "consisting essentially of." Each of the phrases "consisting of" and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item. For purposes of this disclosure, the term "fabric" means "a cloth produced especially by knitting, weaving, or felting fibers," and includes a felt as "a fabric of matted, compressed fibers," as well as "wool" as "a filamentous mass." The term "brush" means "an electrical conductor that makes sliding contact between a stationary and a moving part."

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, generally, etc., as used herein, refer to ±10% of a numerical value or as close as possible to a condition.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

The invention claimed is:

1. An apparatus for preventing electrical arcing, comprising:
   a motor including a rotating shaft and an associated bearing within a motor housing; and
   a brush comprising a conductive fabric for electrically connecting the rotating shaft to the motor housing.

2. The apparatus of claim 1, wherein the brush comprises a conductive base connected to the conductive fabric.

3. The apparatus of claim 1, further including a conductive fastener for connecting the brush to the motor housing.

4. The apparatus of claim 1, wherein the conductive fabric comprises randomly arranged conductive fibers.

5. The apparatus of claim 1, wherein the conductive fabric comprises woven conductive fibers.

6. The apparatus of claim 1, wherein the conductive fabric comprises non-woven conductive fibers.

7. The apparatus of claim 1, wherein the conductive fabric comprises wool.

8. The apparatus of claim 1, wherein the conductive fabric is wool comprising copper.

9. The apparatus of claim 1, wherein the conductive fabric comprises a conductive felt.

10. A fan including the apparatus of claim 1.

11. The fan of claim 10, further comprising a plurality of fan blades connected to the rotatable shaft.

12. An apparatus, comprising:
   a stationary part;
   a rotating part; and
   a brush including conductive fabric for electrically connecting the stationary part to the rotating part.

13. The apparatus of claim 12, wherein the stationary part comprises a housing and the rotating part comprises a motor shaft.

14. The apparatus of claim 12, wherein the conductive fabric comprises woven conductive fibers.

15. The apparatus of claim 12, wherein the conductive fabric comprises non-woven conductive fibers.

16. The apparatus of claim 12, wherein the conductive fabric comprises wool.

17. The apparatus of claim 12, wherein the conductive fabric is wool comprising copper.

18. The apparatus of claim 12, wherein the conductive fabric comprises a conductive felt.

19. A method of preventing electrical arcing in a motor, comprising:
   electrically connecting a rotating shaft with a stationary part of the motor using a brush comprising a conductive fabric.

20. The method of claim 19, further including the step of connecting the rotating shaft to a plurality of fan blades.

* * * * *